United States Patent Office 3,292,670
Patented Dec. 20, 1966

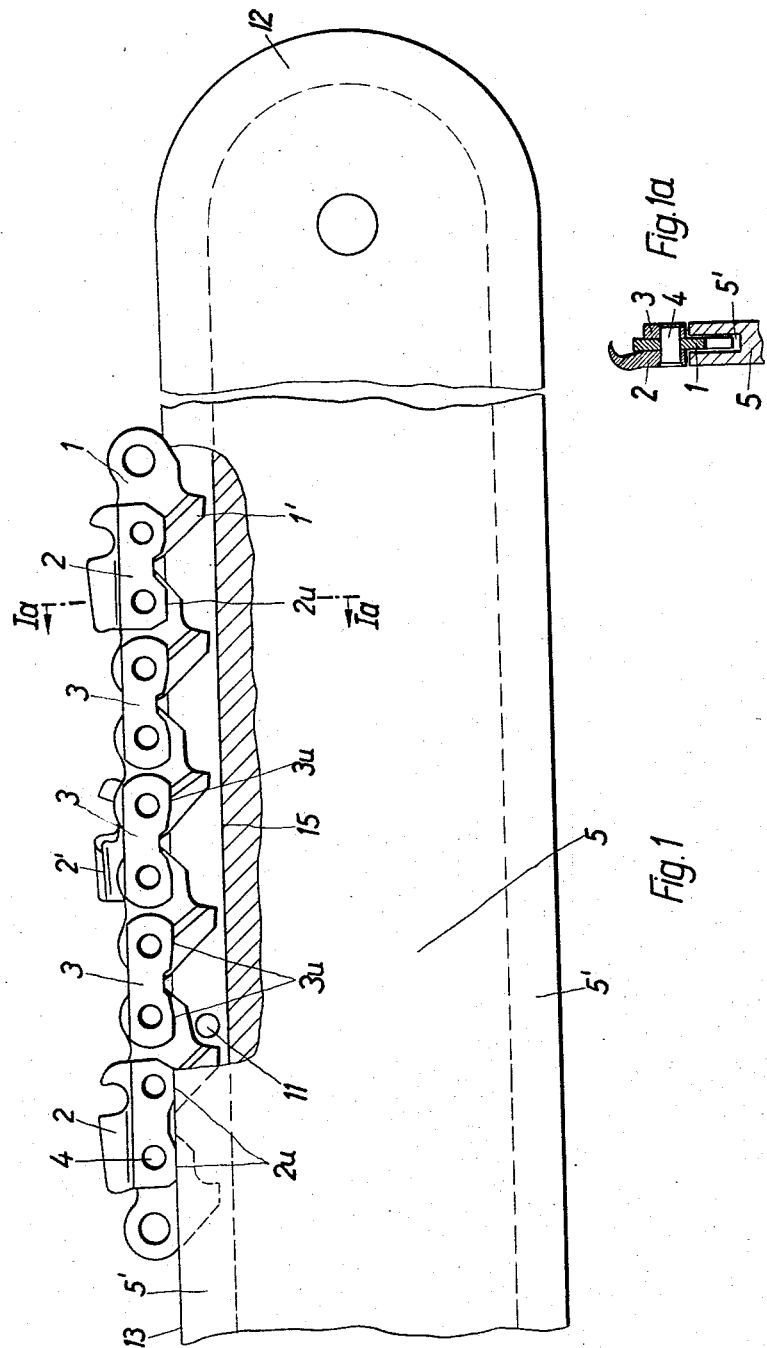

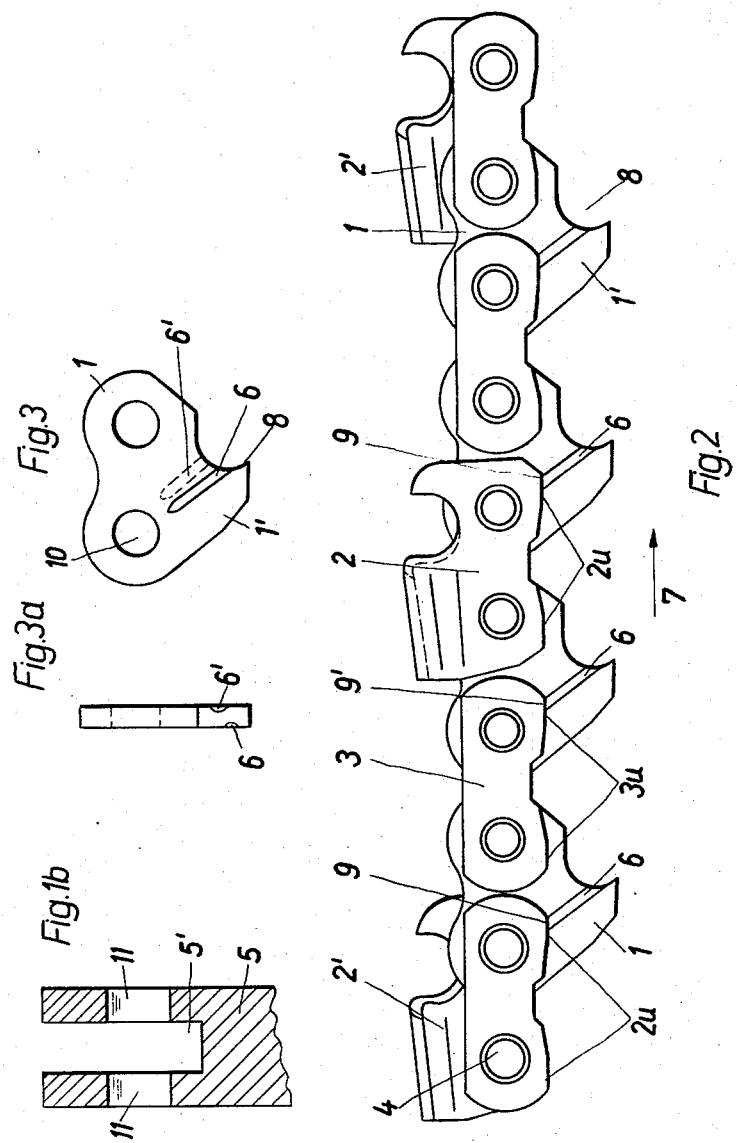

3,292,670
SAW CHAIN FOR MOTOR CHAIN SAWS
Adolf Rätz, Korb im Remstal, and Andreas Stihl, Rohrbronn, Kreis Waiblingen, Germany, assignors to Andreas Stihl, Waiblingen, Germany
Filed Feb. 13, 1964, Ser. No. 344,760
Claims priority, application Germany, Mar. 29, 1963, St 20,456
9 Claims. (Cl. 143—32)

The present invention relates to a saw chain and, more specifically, concerns an arrangement for lubricating saw chains, especially for motor chain saws. Saw chains of this type are composed of centrally located chip-removing or wiping members, connecting plates and alternately arranged cutting teeth elements. The connecting plates or links and cutting teeth elements located on the left and right-hand outside of the chain have their bottom side slide on shoulders of guiding elements of a chain guiding rail which, for purposes of receiving the centrally located removing members, are provided with a groove. The bottom edges of the chain links, which edges slide on the shoulders of the guiding members, are subjected to a considerable wear and, therefore, have to be lubricated. The wear at said bottom edges will occur primarily where the pressure of the cutting tooth causes additional wear. It is here where tears easily occur in the chain links as a result of which the chain can no longer be used even though the cutting teeth elements have not been completely worn. Moreover, the cutting teeth elements or members due to their uneven wear at their sliding under edge will assume a position which is unfavorable for the cut whereby a change in the cutting angle and, more specifically, an increase in the clearance angle might occur.

It is, therefore, an object of the present invention to provide an arrangement for lubricating the saw chain of a motor chain saw, which will overcome the above mentioned drawbacks.

It is another object of this invention to provide an arrangement for lubricating the saw chain of a motor chain saw which will make it possible to lubricate the sliding surfaces of the chain links and of the connecting bolts in such a way that the life of the sliding parts will be greatly increased over heretofore known saw chains.

It is still another object of this invention to provide a lubricating arrangement of the type set forth above, which will assure that the cutting teeth elements will retain their intended cutting angle even over a long use of the chain.

These and other objects and advantages of the invention will appear more clearly from the following specification in connection with the accompanying drawings, in which:

FIG. 1 is a side view and partial section of a chain according to the invention with the guiding rail therefor.

FIG. 2 illustrates a side view of the chain according to FIG. 1 on a somewhat larger scale than the latter.

FIG. 3 is a side view of a chip removing or wiping member.

FIG. 3a represents an end view of the chip removing or wiping member of FIG. 3.

As stated above, the present invention concerns a saw chain, especially for motor chain saws in which the chip removing or wiping members together with their extensions move in a groove of a guiding rail, and in which said chip removing or wiping members are interconnected by connecting links and on alternate sides by cutting teeth members, while the bottom sides of the connecting links and of the cutting teeth members slide on the shoulders of the guiding web of the chain guiding rail. A saw chain of this type is characterized in conformity with the present invention primarily in that the chip removing or wiping members in the groove of the rail are provided with oil ducts. These oil ducts advantageously are formed by grooves preferably arranged at both side surfaces of the chip removing or wiping members.

According to a further feature of the invention, the said grooves extend in a direction opposite to the direction of the movement of the chain from approximately the lowermost point of the chip removing or wiping members upwardly at an incline. Such an arrangement forces the oil to flow upwardly in the groove when the chain is in operation so that the oil will be able to reach the sliding surfaces of the connecting links and cutting teeth members. The start of the oil grooves is advantageously located in the lower range of the chip removal or wiping members in a scoop-like cutout which is concave with regard to the direction of movement of the chain. The upper ends of the grooves are located within the range of the front end of the running shoulders of the chain links. By means of the said scoop-like cutouts, the oil is directly passed into the oil guiding groove and flows along said oil guiding groove to the start of the sliding surface of one connecting link each or a cutting teeth member, and from here the oil is distributed over the entire sliding surface of said last mentioned member.

The grooves, which on a chip removing or wiping member are located opposite to each other, are, in conformity with the present invention, directed in the same direction but are offset with regard to each other so that within the range of the grooves there will be avoided any material decrease in the cross section of the chip removing or wiping member. If desired, the oil grooves may be forged into the said members.

According to a further feature of the invention, the oil ducts have associated therewith at least one lateral oil bore in the rail which, advantageously, is located above the rail groove bottom within the range of the lower end of the oil grooves and transverse to the groove in the rail in which the chip removing or wiping members run. In view of this arrangement, the oil does not pass into the sawdust or meal located at the bottom of the rail groove, which sawdust or saw meal would immediately absorb the oil. Instead, the oil passes directly, and therefore without being soiled, into the oil grooves. If desired, also a plurality of oil bores may be provided distributed along the length of the rail so that the individual said members during one and the same circulation of the chain saw will be supplied with fresh oil a plurality of times.

The oil passing through the oil ducts to the sliding surfaces of the chip removing or wiping members not only lubricates these surfaces but is also pressed between the elements against the transversely located chain bolts whereby also these bolts will be sufficiently lubricated. Moreover, the oil at the chain reversing points at the end of the guiding rail is pressed toward the outside in view of the centrifugal force, as a result of which an additional lubrication of this reversing section will be obtained which is particularly subjected to stresses.

Referring now to the drawings in detail, the saw chain comprises centrally located members 1 which remove chips or wipe out the groove of the support rail alternately arranged cutting teeth members 2 and 2' and connecting links 3. All of these elements are assembled to form a chain by means of chain bolts 4. The bottom edges 2u of the cutting teeth members 2 and the bottom edges 3u of the connecting links 3 are adapted to slide along the shoulders 13 of the guiding webs formed by a groove 5' in the guiding rail 5. The centrally located removing members 1 have their extensions 1' extending in the guiding groove 5'.

In conformity with the present invention (see FIG. 2), the members 1 are provided with oil grooves 6 which, when considering the direction of movement of the chain as indicated by the arrow 7 (FIG. 2) are upwardly inclined in a direction counter to the direction of movement of the chain. These oil grooves, as is evident from FIG. 3, are advantageously arranged on both sides of the member 1. The two oil grooves 6 and 6' extending in the same direction are offset with regard to each other so that within the range thereof there will not be encountered any material reduction in the cross section of the member 1.

The lower ends of the oil grooves 6, 6' lead into a scoop-like recess 8 at the extension 1' of member 1. The recess 8 will, when the chain moves, collect the oil and convey the same to groove 6. In view of the movement of the members 1 in the direction of the arrow 7, the oil is, through grooves 6, conveyed upwardly and passes to the start 9, 9' of the sliding surfaces $2u$ and $3u$ respectively of the cutting teeth members 2 and the connecting links 3 and in its further course is distributed over the entire sliding surfaces $2u$ and $3u$. This arrangement makes possible a particularly effective lubrication of the sliding surfaces of the chain and of the sliding shoulders 13 on the guiding rail 5.

As will be evident from FIG. 3, grooves 6, 6' extend in the direction toward a bore 10 associated with a chain bolt and end in front thereof. In this way, in addition to flowing to the sliding surfaces, the oil also will pass between the overlapping portions of the chain and the chain bolts and will lubricate the same.

The oil is introduced into the range of the scoop-like recesses 8 on the members 1 through a bore 11 extending transverse to the rail groove 5' and located above the bottom 15 of the rail and in this way is introduced in the adjacent grooves 6. In view of this arrangement, the oil will have no opportunity of passing to the rail bottom which is usually filled with saw dust, but will be passed directly through oil bore 11 to the members 1 and will be conveyed in the above described manner to the parts to be lubricated.

At the chain reversing station 12 of the guiding rail 5, the oil will, due to the centrifugal force, be thrown outwardly in radial direction of the reversing contour section of the guiding rail whereby the reversing portion of the rail is additionally lubricated. This is important inasmuch as the reversing portion of the rail is subjected to particularly heavy stresses and wear.

It is, of course, to be understood that the present invention is, by no means, limited to the particular construction shown in the drawings but also comprises any modifications within the scope of the appended claims.

What we claim is:

1. In a chain saw; a supporting and guiding rail having a groove in the edge, first members having flat tooth-like extensions thereon extending slidably into said groove of said guiding rail, connecting links pivotally interconnecting alternate pairs of said first members and cutting tooth links pivotally interconnecting the other pairs of said first members to form a chain, said connecting links and said cutting tooth links having bottom edge portions slidably engaging the shoulders of the guiding rail at the opposite sides of the mouth of the groove therein, oil guiding passage means formed in said extensions of said first members extending parallel to the plane of the extensions and extending therealong from that one end of the respective extension which faces in the direction of movement of the chain, each said oil guiding passage means extending from said one end of the respective extension in the direction opposite to the direction of movement of the chain and each said passage means being inclined relative to the direction of movement of the chain so that the leading one end of each passage means at the said one end of the pertaining extension is nearest to the bottom of said groove in the guiding rail.

2. A chain saw according to claim 1, in which said passage means are in the form of oil grooves offset with regard to each other and are located in the opposite side surfaces of the pertaining extension.

3. A chain saw according to claim 2, in which the said one end of each extension includes a region which is concave in the direction of movement of the chain, and the said oil grooves have their said leading one ends opening in said region near that portion of the region nearest the bottom of the groove in the guiding rail.

4. A chain saw according to claim 3 in which said oil grooves having trailing other ends positioned adjacent the front ends of the said bottom edge portions of the said links which interconnect said first members.

5. A chain saw according to claim 4 in which the oil grooves pertaining to each said extension both extend in the same direction along the pertaining extension.

6. A chain saw according to claim 5 in which the said oil grooves in each extension are forged therein.

7. A chain saw according to claim 2 in which the said guiding rail comprises lateral oil bore means therein transverse to the groove in the guiding rail and located to communicate with the said leading one ends of said oil grooves.

8. A chain saw according to claim 7 which said lateral oil bore means includes a plurality of bores distributed along the length of said rail.

9. A chain saw according to claim 7 in which said oil bore means are disposed on both sides of said guiding rail so as to communicate with both sides of the guiding groove therein and also with both sides of said extensions.

References Cited by the Examiner

UNITED STATES PATENTS

| 1,397,026 | 11/1921 | Wolf | 143—32 |
| 2,558,678 | 6/1951 | Garrett. | |
| 2,748,810 | 6/1956 | Strunk. | |
| 3,068,961 | 12/1962 | Stihl. | |

DONALD R. SCHRAN, *Primary Examiner.*